United States Patent [19]

Grinberg et al.

[11] Patent Number: 4,943,709

[45] Date of Patent: Jul. 24, 1990

[54] LIQUID CRYSTAL ADAPTIVE OPTICS SYSTEM

[75] Inventors: Jan Grinberg, Los Angeles; Thomas R. O'Meara, Jr., Malibu; Murray S. Welkowsky, Chatsworth, all of Calif.

[73] Assignee: Hughes Aircraft Company, Los Angeles, Calif.

[21] Appl. No.: 350,353

[22] Filed: May 11, 1989

[51] Int. Cl.$^5$ ............................................. G01J 1/20
[52] U.S. Cl. ................................. 250/201.9; 356/121
[58] Field of Search .................. 250/201 R, 201.9; 350/347 E, 346; 356/121

[56] References Cited

U.S. PATENT DOCUMENTS

| | | | |
|---|---|---|---|
| 4,141,652 | 2/1979 | Feinleib | 356/121 |
| 4,537,471 | 8/1985 | Grinberg et al. | 350/333 |
| 4,725,138 | 2/1988 | Wirth et al. | 356/121 |

OTHER PUBLICATIONS

John Hardy, "Active Optics: A New Technology for the Control of Light", Proc. of IEEE, vol. 66, No. 6, Jun. 1979, pp. 651–697.
Charles Apt, "Perfecting the Picture", IEEE Spectrum, Jul. 1985, pp. 60–66.
A. I. Lakatos, "Promise and Challenge of Thin-Film Silicon Approaches to Active Matrices", 1982 Int'l Display Research Conf., pp. 146–151.
S. Sherr, "Electronic Displays", A Wiley-Interscience Publication, pp. 304–311.

Primary Examiner—Edward P. Westin
Assistant Examiner—George C. Beck
Attorney, Agent, or Firm—V. D. Duraiswamy; Paul M. Coble; Wanda K. Denson-Low

[57] ABSTRACT

An adaptive optics system is disclosed which has a phase detector to detect phase distortions acquired by an input beam, and a separate phase adjustor which predistorts a transmission beam so that it is restored to its proper phase during transmission back through the same medium travelled by the input beam. The phase adjustor consists of a liquid crystal mechanism with an area substantially greater than that of the phase detector, thereby permitting high power operation. Liquid crystal pixels in the phase adjustor have dual transistor signal storage circuits which apply operating signals to the pixels without significant decay or flicker. The phase adjustor can be constructed in either a reflective or transmissive mode. Two phase adjustors may be placed in series to enhance response time and/or process an unpolarized beam. A data processor interfaces between the phase detector and phase adjustor. The data processor may include a capability for providing phase adjustment information for a plurality of transmission wavelengths based upon the detected distortion of an input beam at only one of the wavelengths.

11 Claims, 5 Drawing Sheets

LIQUID CRYSTAL ADAPTIVE OPTICS SYSTEM

BACKGROUND OF THE INVENTION

1. Field of the Invention

This invention relates to adaptive optics systems for communicating with a distant location through a distorting atmosphere, and more particularly to large area adaptive optics systems in which the distortions in a received communications beam are detected and used to apply compensatory distortions to a transmission beam.

2. Description of the Related Art

A problem has long existed in communicating through the atmosphere with distant objects via optical beams, such as visible light, radar or infrared (IR). The earth's atmosphere is a distorting medium which produces phase shifts in the beam, causing the received beam to differ from the beam as originally transmitted. Normal atmospheric turbulence causes the beam distortion to continuously change, and also to vary from point to point within the beam. Thus, there are problems of both temporal and spatial distortions.

FIG. 1 illustrates the general approach of an adaptive optics system, the purpose of which is to compensate for these distortions. Assume that communication is desired through the atmosphere with a remote target, such as satellite 2. It might be desired to have the satellite reflect a transmitted beam onto a designated target area. The atmospheric turbulence through which the communications must pass is indicated by wavy lines 4. A reference or probe beam 6 having known phase characteristics is transmitted through the atmosphere to the receiving location, where it is analyzed by a distortion sensor 8. Here the actual phase characteristics of the reference beam after passage through the distorting atmosphere are detected in a conventional wavefront error sensor. As a result of this detection, the magnitude and nature of the atmospheric distortion can be determined. This information is applied to a negative distortion device 10, which sets up a distortion that is complimentary to that produced by the atmosphere. A transmission beam 12 is applied to the negative distortion device 10 and picks up a spatial phase distortion which is the opposite of that which it will encounter during transit through the atmosphere to the satellite 2. The result ideally is that the complementary distortions imposed upon the transmission beam by the negative distortion device 10 and by the atmosphere will cancel each other, permitting the satellite to receive the transmission beam in substantially undistorted form.

The negative distortion device has typically been implemented as a spatially deformable mirror, or as a matrix of segmented mirror segments. In one class of mirror the wavefront is controlled by an electrically activated array of pistons (such as a 30×30 array) to move the various portions of the mirror in or out. While a general distortion compensation can be achieved by this approach, the deformable and segmented mirrors suffer from poor resolution and limited size, and are structurally complex. Also, it is difficult to implement them with a response time fast enough to keep up with the normal changes in atmospheric distortion, which typically varies due to turbulence at about 1KHz. A review article which describes the adaptive optics concept and implementations thereof was written by John Hardy, "Active Optics: A New Technology for the Control of Light", Proceedings of the IEEE, Vol. 66, No. 6, June, 1979, pages 651-97.

SUMMARY OF THE INVENTION

In view of the above problems, the present invention seeks to provide an adaptive optics system which has a high resolution, large size and power capability, fast response time, and avoids structural complexity and gross moving parts.

The desired adaptive optics system is realized by providing a means for detecting the spatial phase pattern of an input beam, a means for directing an input beam which has received phase distortions onto the detecting means, and a spatial phase adjustment means, preferably liquid crystal, which is separate from the detecting means and adjusts the spatial phase pattern of an incident transmission beam. Further means are provided which, in response to the detecting means, set the phase adjustment means to compensate for detected phase distortions in the input beam.

In the preferred embodiment, the area of the phase adjustment means is substantially greater than the area of the detection means. The phase detection means may be implemented as an optical wavefront slope detector such as a shearing interferometer.

The phase adjustment means may be set to compensate for detected phase distortions by means of a data processor which has an amplification factor and a response time that set the system's responsivity to phase changes in the input beam at a predetermined level to avoid substantial oscillations or response overshoots. The data processor may be implemented as a linear amplifier, or with certain nonlinear processing operations. The data processor allows appropriate phase adjustment signals to be sent to the phase adjustment means for any one of a plurality of different wavelengths, thereby applying an appropriate phase compensation at any one of the wavelengths, even though liquid crystals have different effects on different wavelengths.

The phase adjustment means includes an array of liquid crystal pixels that are driven by respective transistor drive circuits. Each drive circuit includes a signal storage means, a first transistor which applies a control signal for its respective pixel to the signal storage means, and a second transistor which is responsive to the stored signal for driving the pixel. In this manner substantial signal decay and resulting flicker is avoided.

The phase adjustment mechanism may comprise either a reflective device having an array of liquid crystal pixels with means for reflecting a received transmission beam back through the pixels, or a transmissive device. Two such devices may be arranged in series, with at least the first one being transmissive, to obtain a faster response time than is achievable with a single display having a liquid crystal thickness equal to the aggregate liquid crystal thicknesses of the plurality of devices. With an unpolarized transmission beam, a transmissive phase adjustor may be positioned over a reflective device, with the liquid crystals of each device rotated 90° with respect to the liquid crystals of the other. The phase of the unpolarized transmission beam is thus adjusted as desired by the cooperative action of the two devices.

These and other features and advantages of the invention will be apparent to those skilled in the art from the following detailed description, taken together with the accompanying drawings, in which:

DETAILED DESCRIPTION OF THE INVENTION

The basic approach of the present invention is to provide a phase detector and a separate large area liquid crystal phase adjustment device, to process a transmission beam with the phase adjustor, and to control the phase adjustor with the output of the phase detector so that the spatial phase pattern of the transmission beam is adjusted to compensate for atmospheric turbulence.

Figure 1:
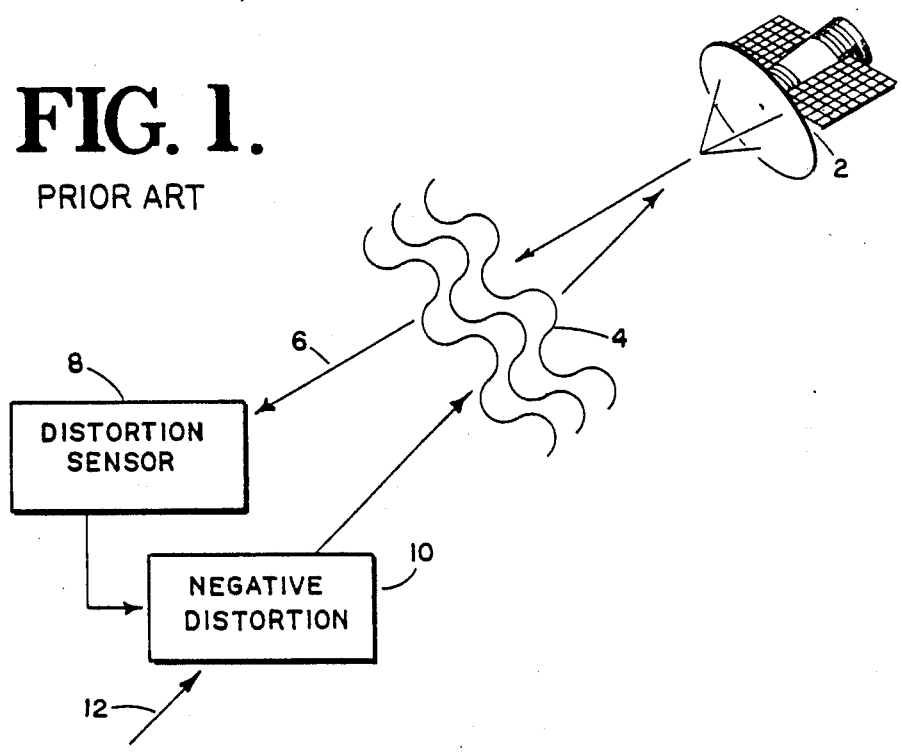
FIG. 1 is a block diagram of a conventional adaptive optics system.
Figure 2:
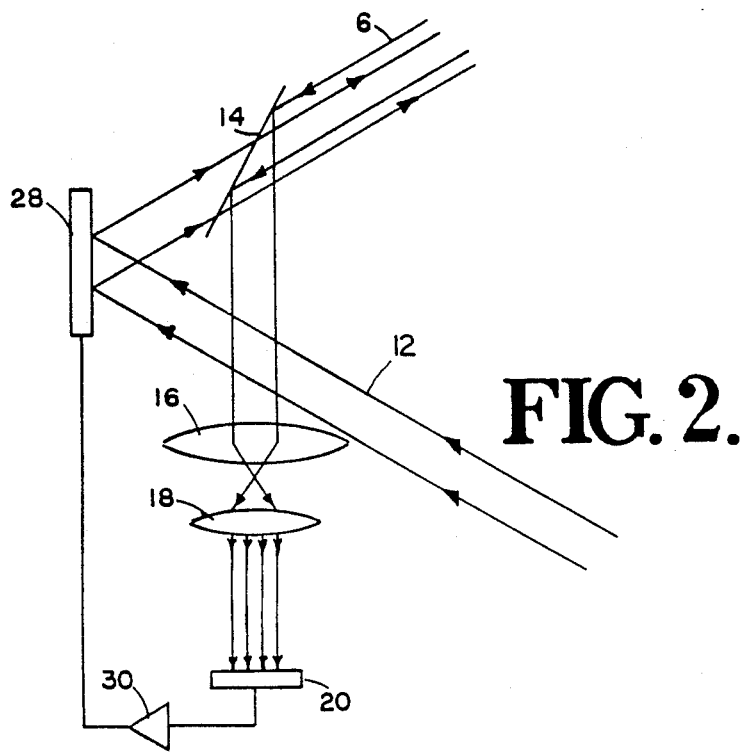
FIG. 2 is a diagram of one embodiment of the present invention in which a reflective liquid crystal phase adjustment mechanism is used to process a transmission beam, and is controlled from the output of a control amplifier.

One embodiment of an implementation of such a system is shown in FIG. 2. An input beam 6 from a remote location is reflected off a beam-splitter mirror 14 and directed through imaging lenses 16 and 18 onto a wavefront error sensing detector 20 of standard design. A transmission beam 12 is directed onto a large area phase adjustment mechanism 28, from which it is reflected parallel to input beam 6. Transmission beam 12 has enough power so that it can reach the remote location from which input beam 6 emanated after reflection from phase adjustor 28.

Phase adjustment mechanism 28 is preferably implemented as a liquid crystal device, but in general it can be based upon any material which exhibits the following properties:

(1) It must have a dipole moment, either permanent or induced. This will give rise to a dielectric anisotropy, which in turn will allow the molecule or particle to rotate in the presence of an electric field.

(2) The material must be birefringent, so that the phase of a polarized incident electromagnetic energy wave can be shifted.

Wavefront error sensing detector 20 provides an indication of how the phase pattern of the received input beam differs from its phase pattern prior to encountering atmospheric distortions. The effect of the atmosphere at any given time can thus be established by observing the sensor output.

The output of wavefront sensor 20 is applied to the input of a data processor 30, which in a simple implementation may be an amplifier. The amplification and response time are preferably selected to optimize the time response of the system so as to avoid oscillations or overshoots in the compensating phase distortions applied to the transmission beam. The processor may also include a reactive network to shape the overall response time of the system.

The output of processor 30 is used to control the phase adjustor 28 so that it supplies the desired compensating phase distortion to the transmission beam. Details of the preferred construction for phase adjustor 28 are provided below. In this embodiment the phase adjustor is a reflective device, such that the transmission beam passes through its liquid crystal layer twice and thereby acquires a doubled phase adjustment.

Figure 3:
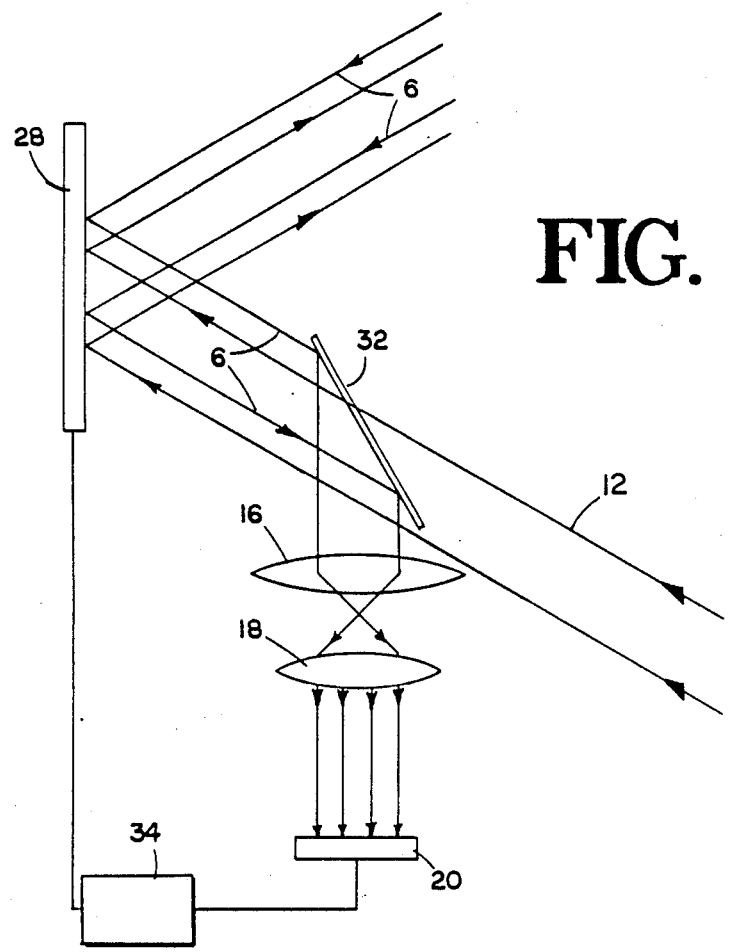
FIG. 3 is a diagram of another embodiment in which a reflective phase adjustment mechanism receives both the transmission beam and the input beam, and is controlled by a phase distortion memory device.

FIG. 3 shows a "closed loop" variation of the FIG. 2 embodiment. Common elements of the two embodiments are identified by the same reference numerals. In the FIG. 3 embodiment, however, input beam 6 is reflected off phase adjustor 28 prior to being reflected onto phase sensor 20 by one-way mirror 32. If phase adjustor 28 is properly set to compensate for the current atmospheric turbulence, the input beam 6' after reflection off phase adjustor 28 should match the reference beam 12, so that only a very small, residual wavefront error is sensed by detector 20. The presence of residual wavefront error indicates the degree by which phase adjustor 28 must be updated to restore accurate phase compensation.

In FIG. 3 a data processor 34 includes a memory storage means, preferably in the form of a programmable ROM (read only memory), which stores a set of optimum gains for compensation of a plurality of different wavelengths. This allows an appropriate phase adjustment signal to be sent to phase adjustor 28 for any one of the plurality of different wavelengths, based upon the wavelength of the input beam. Since birefringent materials such as liquid crystals have different effects on different wavelengths, in this manner an appropriate phase compensation can be applied to a transmission beam at any one of the wavelengths stored in memory. The wavelength of the transmission beam can thus be alternated between two or more wavelengths, with an appropriate compensating phase adjustment imposed upon the beam for each different wavelength. This enables the employment of two or more wavelengths, and thus significantly increases the capabilities of the transmission beam. For example, the transmission beam might alternate between two wavelengths and be used for pointing and tracking when it is at one wavelength, and as a carrier for communications or imaging purposes at another wavelength. The system can thus perform multiple wavelength compensations based upon only a single wavelength measurement for the input beam.

The phase shift $\delta$ in any birefringent medium is determined by:

$$\delta = 2\pi(\Delta n)d/\lambda$$

where $\Delta n$ is the birefringence of the medium, d is the thickness of the medium and $\lambda$ is the optical wavelength. $\Delta n$ is a function of the wavelength (a very weak function in the IR region) and the voltage applied across the birefringent layer, as well as of temperature. Thus, if one has measured the phase distortion at one wavelength, and $\Delta n$ is known for any wavelength, $\delta$ can be calculated as a function of $\lambda$ assuming that the atmospheric or other distortions behave solely as $1/\lambda$, so that measuring at one wavelength is sufficient.

Figure 4:
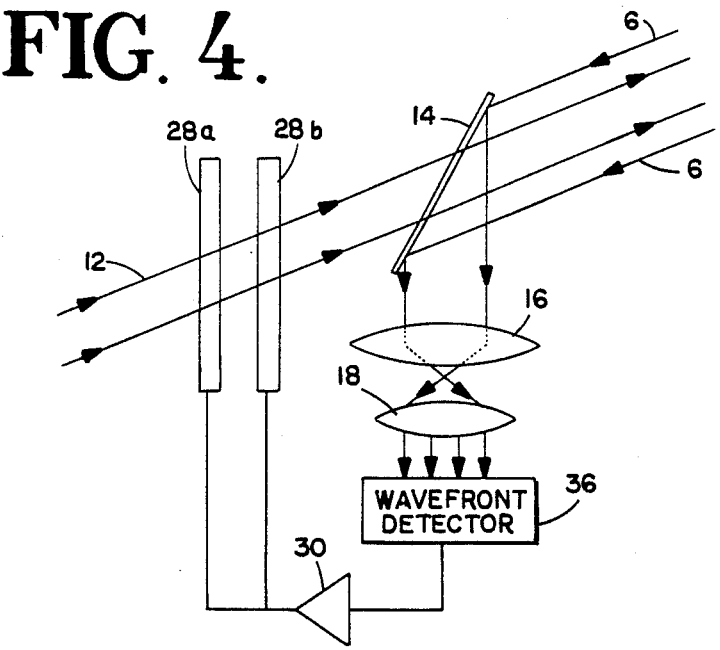
FIG. 4 is a diagram of another embodiment employing a pair of transmissive phase adjustment devices, and a wavefront detector to detect phase distortions in the input beam.

FIG. 4 shows another embodiment in which a pair of phase adjustors 28a and 28b are constructed to operate in a transmissive mode, rather than in a reflective mode as in the previous embodiments. The two phase adjustors are optically positioned in series so that the transmission beam 12 is processed by each individual phase adjustor in succession. This technique effectively reduces the required liquid crystal thickness for a given dynamic range in half. Since the liquid crystal decay time is a function of the square of the liquid crystal thickness within each phase adjustor, the response time of each device is one-fourth that of a single phase adjustment mechanism of similar construction whose liquid crystal thickness is equal to the aggregate liquid crystal thicknesses of the series phase adjustors 28a and 28b.

The above embodiments each use liquid crystal phase adjustment mechanisms. The effective optical path length of an incident light beam, and thus its phase, is modulated by tilting the liquid crystal molecules in a given plane. The maximum change in the optical path length is achieved when the liquid crystal molecules are rotated by a full 90° within that plane. For description purposes, it may be assumed that the liquid crystal molecules are tilted within the XZ plane, with Z being the direction of light propagation and the X-axis parallel to the initial orientation of the liquid crystal molecules.

Figure 5:
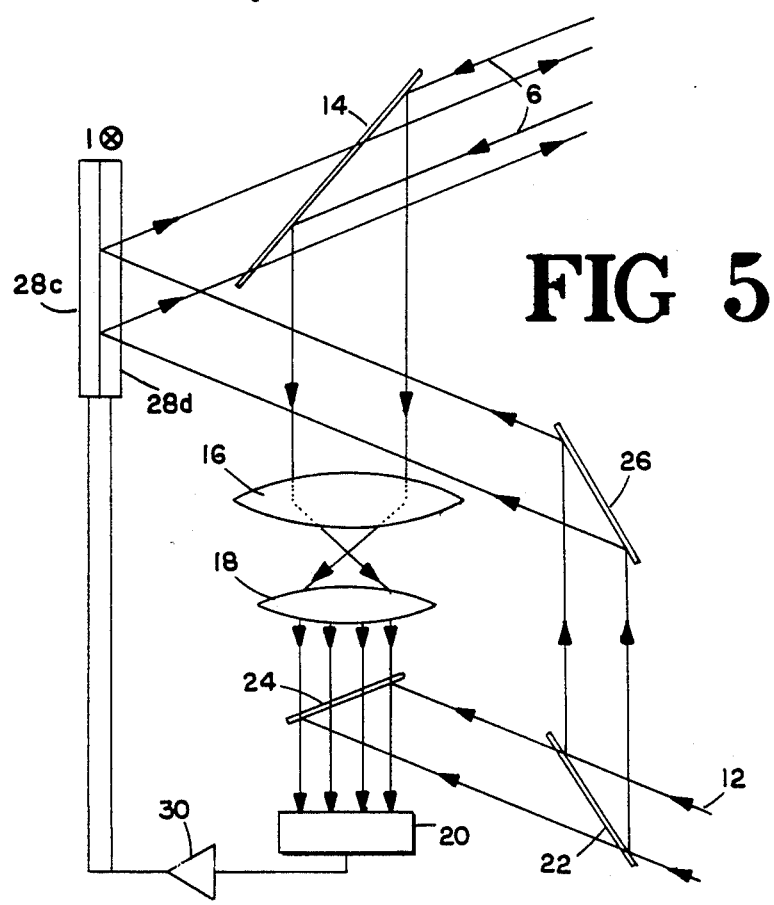
FIG. 5 is a diagram of another embodiment in which a transmissive phase adjustment device is placed over a reflective device to provide polarized distortion compensation for the transmission beam.

The above described phase modulation will occur for light polarized parallel to the X-axis only. Light polarized in the Y direction, perpendicular to the XZ plane, will not experience any modulation because rotating the liquid crystal molecules in the XZ plane does not vary the refractive index in the Y direction. To modulate the phase of an unpolarized beam, which has components in both the X and Y directions, the embodiment of FIG. 5 uses two liquid crystal phase adjustors 28c and 28d in series, one superimposed on the other. The base phase adjustor 28c is reflective device; the other phase adjustor 28d is transmissive and is positioned over device 28c. Alternately, two transmissive devices could be used.

The orientation of the liquid crystals within the two phase adjustors 28c and 28d are rotated by 90° with respect to each other. Accordingly, the liquid crystal extraordinary axis will be oriented in the X direction for one device and in the Y direction for the other. The two devices receive the same electrical input signals from data processor 30, corrected by a fixed ratio to compensate for any difference in the liquid crystal thicknesses of the two. The orientation of the liquid crystals is indicated by the symbols over each device.

Figure 6:
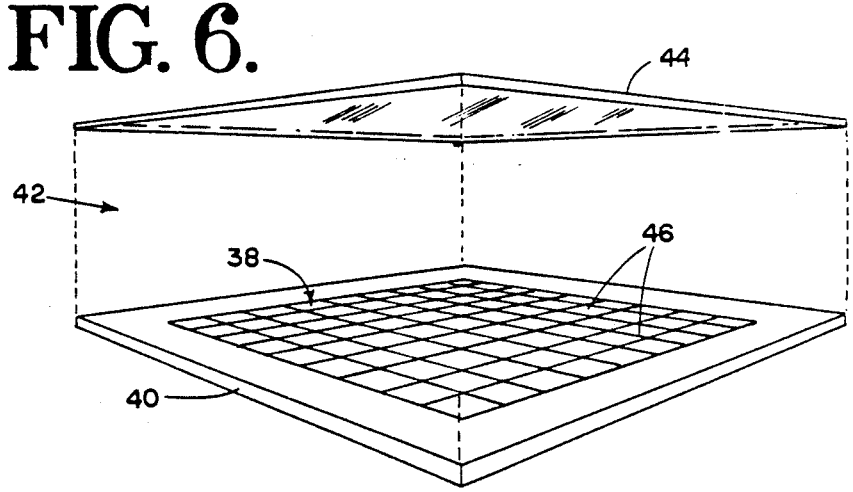
FIG. 6 is a perspective view showing a preferred pixel arrangement of a phase adjustment mechanism.
Figure 7:
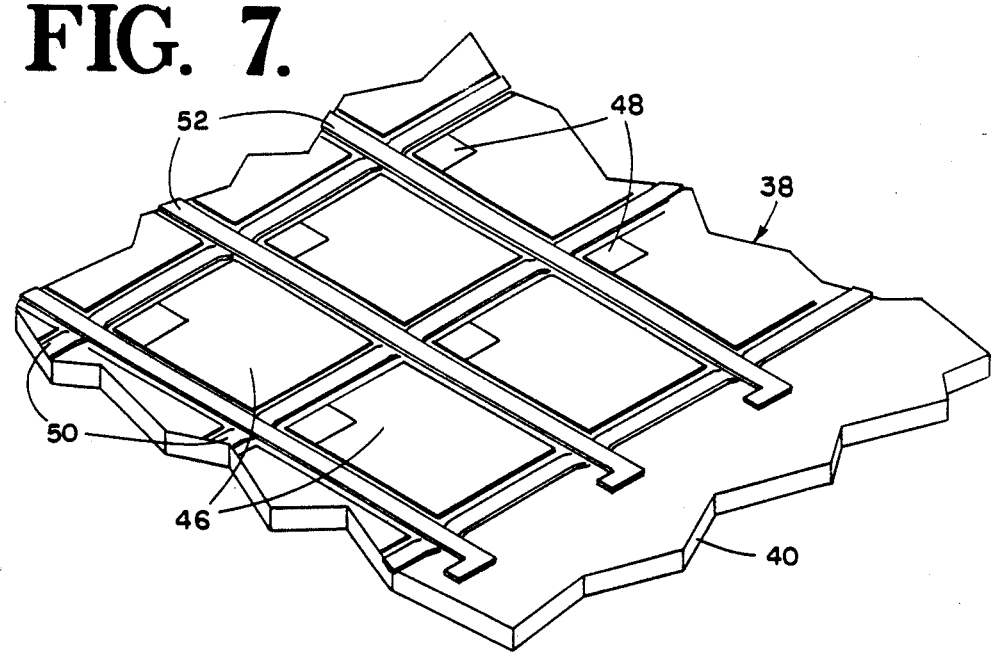
FIG. 7 is an enlarged fragmentary perspective view of a portion of the phase adjustor of FIG. 6, showing several pixels and their respective drive circuit locations.

The preferred operative construction of the liquid crystal phase adjustment mechanism is illustrated in FIGS. 6 and 7. It consists of a pixel matrix 38 formed on a support substrate 40, typically glass or germanium. Substrate 40 must be transparent to the wavelength of interest for a transmissive device, but may be opaque for a reflective device. A layer of liquid crystals 42 is sandwiched between the pixel matrix 38 and an overlying counterelectrode 44, which is held at a reference voltage.

The construction of the phase adjustment mechanism is generally similar to that of a flat panel display, which is disclosed in S. Sherr, "Electronic Displays", John Wiley & Sons, 1979, pages 304–311. The pixel matrix 38 consists of a matrix of islands, each of which includes a conductive pad 46 and a much smaller pixel drive circuit 48. Each drive circuit applies electrical signals to its associated conductive pad to establish a potential difference between the conductive pad and the overlying counterelectrode 44. This potential difference activates the adjacent liquid crystals in the pixel section immediately above the island. The drive circuit for each pixel receives its own control signals from the system data processor, so that the liquid crystals within each pixel are oriented independent of the other pixels. In this manner a transmission beam transmitted through the device may effectively be segmented into an array of pixels, with an individual phase adjustment applied to each pixel. The conductive pads 46 are formed from a reflective metal such as aluminum for a reflective device, or from a conductor such as indium tin oxide (ITO) which is transparent to the wavelength of interest for a transmissive device.

Data inputs are furnished to the drive circuits via data busses 52, while strobe signals are applied via strobe busses 50. The various strobe lines are strobed in succession, with only one line strobed at a time; all of the non-strobed lines are grounded. This allows the use of a single data bus 52 for an entire column of pixels, since only the single pixel in the column which is being strobed at any given time will receive the data. As explained below, a particular drive circuit design is used which stores the data signal without significant decay between successive strobes of the same circuit.

The data inputs to the drive circuits are provided from the phase detection mechanism 20 via the data processor 30. The matrix of drive circuits is addressed in a mirror fashion to the detector readout scheme. Normally the detector will be read out line by line, with a line of information applied to the vertical data busses 52 and at the same time a strobe signal applied to the appropriate vertical strobe bus. The line of information will be stored in the strobed line of drive circuits for the entire frame time while the other lines are being scanned.

Figure 8:
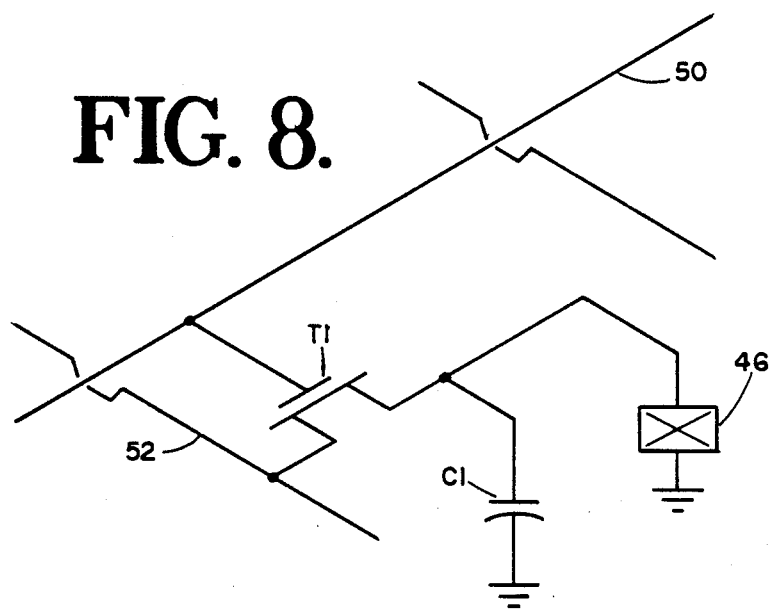
FIG. 8 is a schematic diagram showing an elementary form of the pixel drive circuit.

A basic form of a pixel drive circuit is shown in FIG. 8. It includes a single field effect transistor (FET) T1 which connects a data bus 52 to a signal storage capacitor C1 via the transistor source-drain circuit. The strobe line 50 is connected to the transistor gate. When the transistor is strobed, a charge determined by the data signal is accumulated on capacitor C1. The capacitor is connected to the conductive pad 46, and the signal which it holds is discharged through the liquid crystal above the pad during the frame time.

Figure 9:
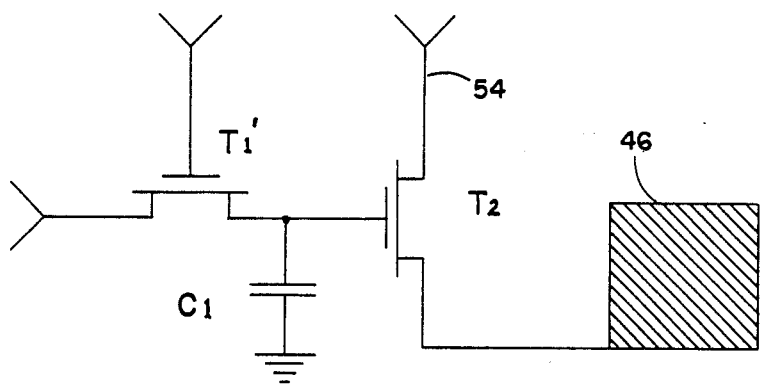
FIG. 9 is a schematic diagram showing the preferred form of the pixel drive circuit.

The capacitor discharge can cause a significant decay of the liquid crystal activation during the frame time, which will be perceived as flicker or phase variation. To significantly reduce the flicker, a sample and hold circuit such as that shown in FIG. 9 may be used. In this circuit transistor T1' applies a data signal to the storage capacitor C1 as before. However, C1 is disconnected from the conductive pad 46, and instead applies the stored signal to the gate of a second FET T2. The source-drain circuit of this transistor connects a voltage bus 54 to the conductive pad; the signal applied to pad 46 is controlled by the capacitor signal applied to the gate of T2. This configuration can practically eliminate the voltage decay across the liquid crystal because the discrete charge storage element C1 is now isolated from the finite liquid crystal load by the high input impedance of the buffer transistor T2. The total area required by T1' and T2 can be significantly smaller than that required by transistor T1 of FIG. 8 alone. This in turn should result in a proportional increase in device yield, since the probability of the gate shorting generally scales with the total device area. Similarly, since the data input lines in the two-transistor configuration of FIG. 9 do not have to handle the large peak currents of FIG. 8, the metal line dimensions can also be scaled down to increase the effective display area of each pixel. This increase in geometric duty cycle is important for minimizing scattering from the edges of circuit features.

The drive circuit can be implemented using bulk silicon or thin silicon technologies. When a relatively low resolution device is needed, such as a 100×100 array, the sample and hold circuit of FIG. 9 can be fabricated using small scale integration technology. For higher resolution devices it would be preferable to use thin film silicon technology, such as silicon-on-sapphire.

Figure 10:
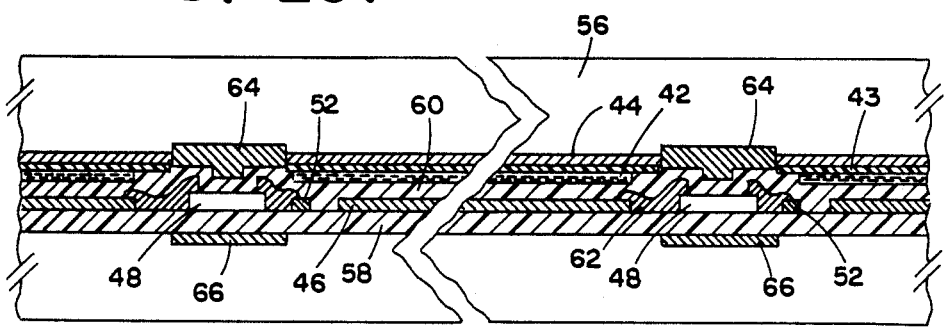
FIG. 10 is a sectional view showing the construction of an individual pixel.

A cross-section of the preferred construction for the phase adjustor, showing one complete pixel and portions of adjacent pixels, is given in FIG. 10. The operative elements are mounted between support substrate 40 and an upper transparent electrode layer 56. A drive circuit 48, conductive pad 46 and electrical bus 52 are formed on an insulating layer 58, preferably $SiO_2$, which insulates the drive circuit from the support substrate. The elements on $SiO_2$ layer 58 are surmounted by another $SiO_2$ layer 60, which acts as an alignment layer for the liquid crystal 42. If the support substrate is an insulator, it is possible to "cement-in" the MOSFET silicon drivers without an oxide layer 58. $SiO_2$ layer 60 is approximately 100 Angstroms thick, and orients the liquid crystal molecules so that they are parallel to the electrode pad 46.

The drive circuits 48 are connected to their respective conductive pads 46 by metallic leads 62, which also extend over lower $SiO_2$ layer 58. The drive circuits are shielded from visible light on their transmission or readout side by metallic light blocking elements 64, to prevent the drive circuit silicon from becoming photoactivated. Light blocking layers 64 are insulated from the drive circuits by the $SiO_2$ layer 60. In the case of a transmissive rather than reflective device, another set of light blocking elements 66 are provided on the underside of lower $SiO_2$ layer 58 to shield the drive circuit chips from the underside.

In a reflective mode operation, the transmission beam enters the pixel through liquid crystal layer 42, is reflected off conductive pad 46, and exits back through the liquid crystal layer. The drive circuit 48 applies a voltage to the conductive pad 46, under the control of the phase sensor 20 and data processor 30, to establish a desired voltage differential between conductive pad 46 and counterelectrode 44. This voltage differential controls the alignment of the liquid crystal within the pixel, which in turn determines the phase of the portion of the transmission beam processed by the pixel. The various drive circuits are controlled so that a pre-distortion is applied to the transmission beam to effectively compensate for and cancel out the atmospheric distortion detected from the input beam.

Large area phase adjustors can be implemented in this manner, significantly larger than the phase detection mechanism. The size of the phase adjustor can be as large as 0.5×0.5 meters or greater, which could produce a large power handling capability on the order of $10^7$ Watts peak power; a power limit would be imposed by the nonlinear effects in the liquid crystal which start at about 10 KW/cm$^2$. The phase adjustor is suitable for the very low light level detection required for adaptive optics. It can be made sensitive to infrared radiation, as well as to visible light and other portions of the electromagnetic spectrum.

While several embodiments of the invention have been shown and described, numerous variations and alternate embodiments will occur to those skilled in the art. Accordingly, it is intended that the invention not be limited solely to the described embodiments. Various modifications are contemplated and can be made without departing from the spirit and scope of the invention, as hereinafter defined by the appended claims.

We claim:

1. An adaptive optics system, comprising:
    means for detecting the spatial phase pattern of an input beam,
    means for directing an input beam which has phase distortions onto said detecting means,
    a spatial phase adjustment means separate from said detecting means for adjusting the spatial phase pattern of an incident transmission beam,
    means for providing said incident transmission beam to said spatial phase adjustment means, and
    means responsive to said detecting means for setting said phase adjustment means to compensate for detected phase distortions in said input beam, comprising a data processor having a memory means for storing phase compensation information for a plurality of different wavelengths, said memory means providing phase adjustment information for each of said wavelengths in response to the input beam.

2. The adaptive optics system of claim 1, wherein the area of said phase adjustment means is substantially greater than the area of said detection means.

3. The adaptive optics system of claim 1, said detecting means comprising an optical wavefront detector.

4. The adaptive optics system of claim 1, said data processor comprising an amplifier having an amplification factor and a response time which set the system's responsivity to phase changes in the input beam at a predetermined level which avoids substantial oscillations or response overshoots.

5. The adaptive optics system of claim 1, said phase adjustment means having an array of liquid crystal pixels driven by respective transistor drive circuits.

6. The adaptive optics system of claim 4, the transistor drive circuit for each pixel comprising a signal storage means, a first transistor connected to apply a control signal for its respective pixel to said signal storage means, and a second transistor which is responsive to the signal stored in said signal storage means for driving said pixel.

7. The adaptive optics system of claim 1, said phase adjustment means having an array of liquid crystal pixels, and means for reflecting a transmission beam transmitted through said pixels back through said pixels.

8. The adaptive optics system of claim 1, said phase adjustment means employing liquid crystals to adjust the spatial phase pattern of an incident transmission beam.

9. An adaptive optics system comprising:

means for detecting the spatial phase pattern of an input beam, means for directing an input beam which has received phase distortions onto said detecting means, a spatial phase adjustment means separate from said detecting means for adjusting the spatial phase pattern of an incident transmission beam, said phase adjustment means comprising the combination of a plurality of individual liquid crystal spatial phase adjustment means optically positioned in series so that a transmission beam is processed by each individual phase adjustment means in succession, said combination phase adjustment means having a faster response time than a single liquid crystal spatial phase adjustment means of similar construction whose liquid crystal thickness is equal to the aggregate liquid crystal thicknesses of said plurality of individual phase adjustment means, means for providing said incident transmission beam to said spatial phase adjustment means, and means responsive to said detecting means for setting said phase adjustment means to compensate for detected phase distortions in said input beam.

10. An adaptive optics system comprising:

means for detecting the spatial phase pattern of an input beam, means for directing an input beam which has received phase distortions onto said detecting means, a spatial phase adjustment means separate from said detecting means for adjusting the spatial phase pattern of an incident transmission beam, said phase adjustment means comprising the combination of a pair of individual liquid crystal spatial phase adjustment means optically positioned in series so that a transmission beam is processed by both individual phase adjustment means, the liquid crystals of each individual phase adjustment means being rotated substantially 90° with respect to the liquid crystals of the other individual phase adjustment means so that the phase of an incident unpolarized transmission beam is adjusted in accordance with said phase adjustment setting means, means for providing said incident transmission beam to said spatial phase adjustment means, and means responsive to said detecting means for setting said phase adjustment means to compensate for detected phase distortions in said input beam.

11. The adaptive optics system of claim 9, wherein said pair of individual liquid crystal phase adjustment means comprises a transmissive phase adjustment means positioned over a reflective phase adjustment means.

* * * * *